(12) United States Patent
Li (10) Patent No.: US 6,753,780 B2
(45) Date of Patent: Jun. 22, 2004

(54) VEHICLE OCCUPANT DETECTION SYSTEM AND METHOD USING RADAR MOTION SENSOR

(75) Inventor: Songnian Li, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 188 days.

(21) Appl. No.: 10/099,832

(22) Filed: Mar. 15, 2002

(65) Prior Publication Data

US 2003/0201894 A1 Oct. 30, 2003

(51) Int. Cl.$^7$ .................. G08B 23/00; G08B 13/18; H04Q 1/30; B60R 22/00; B60D 1/28
(52) U.S. Cl. .................. 340/573.1; 340/438; 340/554; 340/575; 701/45; 701/46; 180/271; 180/273; 280/735
(58) Field of Search .................. 340/573.1, 575, 340/438, 425.5, 554; 701/45, 46; 180/271, 273; 600/300; 280/735

(56) References Cited

U.S. PATENT DOCUMENTS

| | | | | |
|---|---|---|---|---|
| 4,958,638 A | * | 9/1990 | Sharpe et al. ................ 600/407 |
| 5,361,070 A | * | 11/1994 | McEwan ...................... 342/21 |
| 5,474,327 A | | 12/1995 | Schousek ..................... 280/735 |
| 5,942,695 A | | 8/1999 | Verma et al. ................. 73/768 |
| 5,966,090 A | * | 10/1999 | McEwan ...................... 342/27 |
| 5,987,370 A | | 11/1999 | Murphey et al. ............. 701/45 |
| 6,012,007 A | | 1/2000 | Fortune et al. ............... 701/45 |
| 6,058,341 A | | 5/2000 | Myers et al. ................. 701/45 |
| 6,101,436 A | | 8/2000 | Fortune et al. ............... 701/45 |
| 6,138,067 A | | 10/2000 | Cobb et al. ................... 701/45 |
| 6,246,936 B1 | | 6/2001 | Murphey et al. ............. 701/45 |
| 6,360,618 B2 | | 3/2002 | Anahid et al. ......... 73/862.627 |
| 6,424,898 B2 | | 7/2002 | Anishetty et al. ............ 701/45 |
| 6,438,476 B1 | | 8/2002 | Gray et al. ................... 701/45 |
| 6,438,477 B1 | | 8/2002 | Patterson et al. ............. 701/45 |
| 6,479,776 B2 | | 11/2002 | Nakase et al. ............... 200/559 |
| 6,542,802 B2 | | 4/2003 | Gray et al. ................... 701/45 |
| 6,578,871 B2 | | 6/2003 | Gray et al. ................... 280/735 |
| 6,587,770 B1 | | 7/2003 | Gray et al. ................... 701/45 |

OTHER PUBLICATIONS

Breed et al., Vehicular Occupant Motion Detection system using radar, Nov. 22, 2001; US 2001/0042977A1.*

* cited by examiner

Primary Examiner—Jeffery Hofsass
Assistant Examiner—Lam Pham
(74) Attorney, Agent, or Firm—Jimmy L. Funke; Stefan V. Chmielewski (57) ABSTRACT

A motion sensing system and method for detecting an occupant in a vehicle with enhanced sensitivity to detect small movement, such as movement caused by heartbeat and breathing of an occupant. The system includes a radar motion sensor located in a compartment of the vehicle. The radar sensor transmits and receives signals within the compartment and generates sensed signals. The system has a controller for converting the sensed signals to a frequency domain. The controller further processes the frequency domain of sensed signals and determines the presence of movement of an occupant due to one of heartbeat and breathing of the occupant.

28 Claims, 8 Drawing Sheets

VEHICLE OCCUPANT DETECTION SYSTEM AND METHOD USING RADAR MOTION SENSOR

TECHNICAL FIELD

The present invention generally relates to vehicle occupant sensing and, more particularly, relates to radar motion sensing to detect occupant movement in a vehicle.

BACKGROUND OF THE INVENTION

There are situations where it is generally undesirable to leave a child, an elderly passenger, an unconscious passenger, or a pet in the passenger compartment of a vehicle for an extended period of time. This is especially true on a hot day when the inside vehicle temperature may become extremely high. It is therefore desirable to detect when an occupant may be trapped in the passenger compartment of a vehicle, or other compartments, such as the trunk compartment. In order to detect the presence of an occupant to thus reduce the risk to the occupant, it is desirable to provide for an occupant sensing system that detects the presence of the occupant in the vehicle.

In the past, radar motion sensing systems have been employed in vehicles to detect substantial movement of objects within the vehicle. In particular, vehicle security systems have employed radar motion sensing devices for detecting large movements within the vehicle such as entering or exiting of an occupant from the vehicle and movement applied to the vehicle from the outside typically, in an attempt to secure the vehicle against theft. While prior radar motion sensing systems have been used to detect large movements in a vehicle, the amount of movement detected is generally limited to rather significant movements of large objects. Conventional vehicle radar motion sensing approaches have not reliably provided the ability to sense the presence of a relaxed infant or an unconscious passenger within the vehicle.

Accordingly, it is therefore desirable to provide for a vehicle occupant sensing system that exhibits high sensitivity for sensing the presence of an occupant within the vehicle. In particular, it is desirable to provide for a vehicle occupant sensing system and method which detects small movement of an occupant, such as a relaxed infant or an unconscious passenger, within a compartment in the vehicle.

SUMMARY OF THE INVENTION

According to the teachings of the present invention, a motion detection system and method for detecting an occupant in a vehicle are provided which realizes enhanced sensitivity to detect small movement, such as movement caused by heartbeat and breathing of an occupant. According to one aspect of the present invention, the motion detection system for detecting an occupant in the vehicle includes a radar motion sensor located in a compartment of the vehicle. The radar motion sensor transmits and receives signals within the compartment and generates sensed signals. The motion detection system further includes a controller converting the sensed signals to a frequency domain. The controller further processes the frequency domain of sensed signals and determines the presence of movement of an occupant due to one of heartbeat and breathing of an occupant.

According to another aspect of the present invention, a method is provided for detecting an occupant in a vehicle. The method includes the steps of transmitting a radar signal within a compartment in a vehicle, receiving the transmit radar signals, and generating radar sensor output signals. The method also includes the steps of transforming the radar sensor output signals to a frequency domain, and processing the frequency domain of received radar sensor output signals within a frequency range. The method further includes the step of determining movement due to one of breathing and heartbeat of an occupant based on the processing. Accordingly, the motion detection system and method of the present invention provides enhanced sensitivity to detect very small movement within a vehicle so as to detect the presence of an occupant therein.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
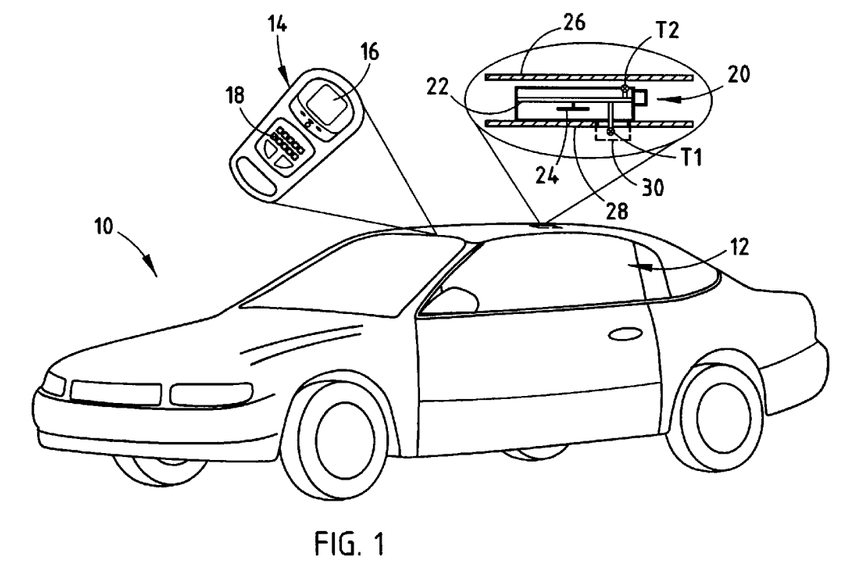
FIG. 1 is a perspective view of a vehicle having an overhead console and a radar motion sensing system shown in an enlarged cross-sectional view.

Referring to FIG. 1, a passenger vehicle 10 is generally shown equipped with a radar motion sensing system 20 for detecting the presence of an occupant in the passenger compartment 12 of the vehicle 10. The vehicle 10 has an overhead console 14 installed below the headliner in the passenger compartment 12 and containing various electronic devices including a display module 16 and various light emitting diodes (LEDs) 18. The radar motion sensing system 20 is generally shown installed between the vehicle roof 26 and interior headliner 28 and arranged to transmit and receive microwave radar signals within a zone which covers the vehicle passenger compartment sufficiently to enable detection of movements within the passenger compartment.

The radar motion sensing system 20 includes a printed circuit board 22 containing various electronics mounted thereto including a microprocessor-based electronic control unit and transceiver electronics. The radar motion sensing system 20 further includes antennas 24 configured to provide the radar coverage zone sufficiently shaped to cover the passenger compartment 12 of the vehicle 10. It should be appreciated that the antennas 24 may include one or more antennas configured to transmit microwave radar signals and one or more antennas configured to receive the reflected microwave radar signals. In addition, the radar motion sensing system 20 includes first and second thermistors T1 and T2 for detecting vehicle inside temperature and outside ambient temperature, respectively. A grill 30 is further shown mounted to the bottom of headliner 28 to cover thermistor T1.

Figure 2:
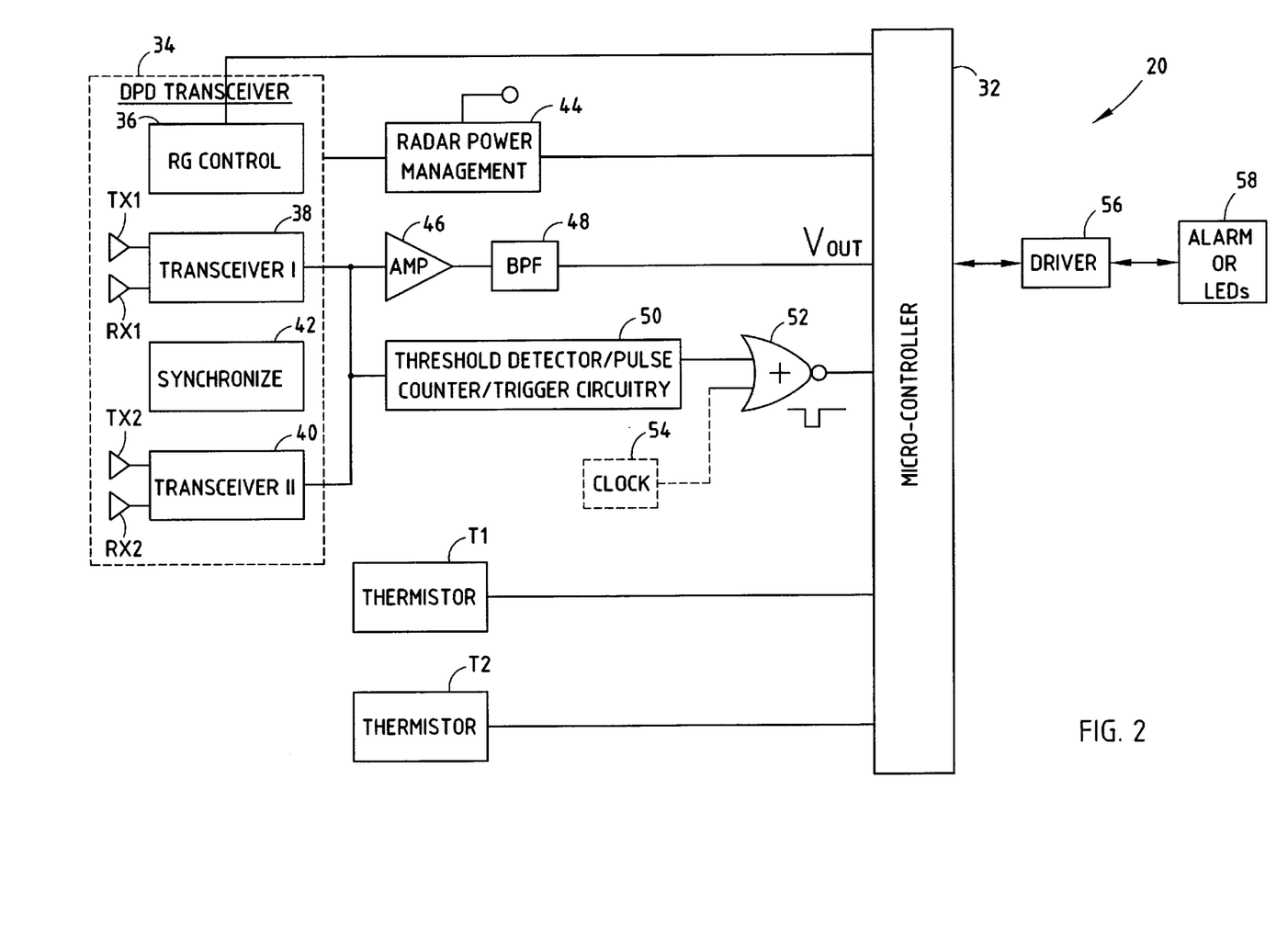
FIG. 2 is a block diagram further illustrating the radar motion sensing system.

The radar motion sensing system 20 is shown in greater detail in FIG. 2, according to one embodiment. In the embodiment shown, the radar motion sensing system 20 includes a Differential Pulse Doppler (DPD) transceiver 34 for transmitting and receiving the microwave radar signals. Transceiver 34 generally includes a first transceiver 38 equipped with a first transmitting antenna TX1 and a first receiving antenna RX1, and a second transceiver 40 equipped with a second transmitting antenna TX2 and a second receiver RX2. The transceiver 34 also has range gate (RG) control circuitry 36 for controlling the coverage range of the transceiver 34, and synchronize circuitry 42 for synchronizing the operation of the first and second transceivers 38 and 40. While a DPD transceiver 34 is shown and described herein, it should be appreciated that various types of radar motion sensors may be employed without departing from the teachings of the present invention.

The radar motion sensing system 20 also includes an electric control unit, also referred to herein as microcontroller 32, for processing the microwave radar signals and determining the presence of an occupant within the vehicle. The microcontroller 32 may include a commercially available microprocessor-based controller having processing and memory capability. The microcontroller 32 is programmed with various routines, as described herein, to determine the presence of an occupant within the vehicle 10.

Microcontroller 32 controls the range gate of the DPD transceiver 34 via the RG control circuitry 36. A radar power management circuit 44 is connected between the transceiver 34 and microcontroller 32 to power on/off the radar as desired. The output generated by the first and second transceivers 38 and 40 is provided to an amplifier 46 and a band pass filter (BPF) 48 to generate an output signal $V_{OUT}$. The BPF 48 provides band pass filtering within a range of 0.1–10.0 Hz to remove noise, and thus enhance the signal-to-noise ratio. Additionally, the output of first and second transceivers 38 and 40 is also supplied to threshold detector/pulse counter/trigger circuitry 50 which generates a trigger signal, caused by large movement in the radar detecting zone, to wake up the microcontroller 32 when it is in an energy saving mode (to minimize consumption of battery). A logic NOR gate 52 which receives an input from clock 54 provides a way to wake up the microcontroller 32 to periodically measure the vehicle interior temperature via thermistor T1 to determine if the inside temperature is critically high to any trapped occupant.

The radar motion sensing system 20 includes the first and second thermistors T1 and T2 which sense ambient temperature within the vehicle and ambient temperature outside of the vehicle, respectively. The thermistors T1 and T2 generate temperature output signals that are input to the microcontroller 32. The microcontroller 32 further communicates through with a driver interface 56 to provide an alarm when an occupant is detected within the vehicle and the interior temperature is excessively high to this occupant. Other control devices may receive this alarm from the radar motion sensing system 20, and may inform the driver via an alarm or indicator, notify others for assistance, or take other corrective action, such as opening a window when a trapped occupant is detected within the vehicle 10.

Figure 3:
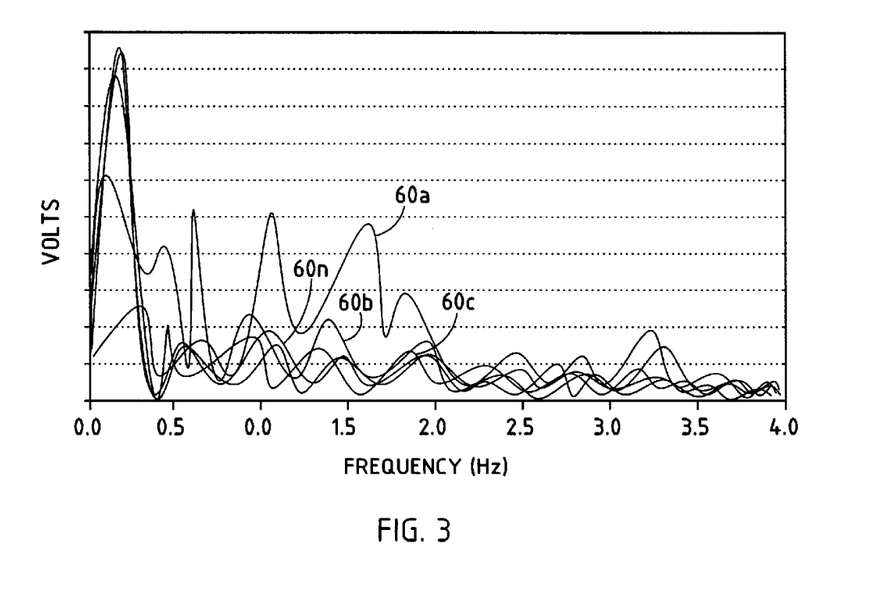
FIG. 3 is a graph illustrating examples of frequency domain signals generated by the radar motion sensing system during heartbeat and breathing movement of a sleeping occupant.

The DPD transceiver 34 uses conventional radar transmission and reception to transmit and receive microwave radar signals within a coverage zone in the vehicle. The radar output signal f(t), which is sensed in the time domain, is classified into different group types using a signal classifier. The signals classified in the group type relating to large continuous movements will trigger the alarm output if this type of signal occurs frequently. Pulse type signals are generally ignored, since it is desired to eliminate false alarms due to scenarios such as a ball bumping the vehicle roof, etc. The signals classified as continuous movement type signals are transformed into a frequency domain signal $F_{(\omega)}$, using fast Fourier transform (FFT). A plurality of historical data sets $F_{1(\omega)}, F_{2(\omega)}, \ldots F_{N(\omega)}$ in the frequency domain are stored in memory. An example of a plurality of data sets $F_{1(\omega)} - F_{N(\omega)}$ is illustrated by curves 60a–60c in FIG. 3. The data acquired in the frequency domain data sets is processed to determine whether an occupant is detected within the vehicle. In doing so, a plurality of frequency domain data sets are averaged so as to obtain an average frequency domain signal. One example of a frequency domain average signal is shown by line 60 in FIG. 4. The average signal 60 shows peaks at certain frequencies which could be indicative of occupant body movement caused by heartbeat and breathing of an occupant in the vehicle. In order to capture occupant body (e.g., chest) movement due to breathing and heartbeat of occupants such as human beings, a frequency window is selected generally in the range of about 0.2 to 2.0 Hz, according to one example. The averaged signal within the frequency window is compared to a threshold and is also compared to known frequency characteristics of expected movement due to heartbeat and breathing to determine occupant movement within the vehicle.

Figures 4, 5:
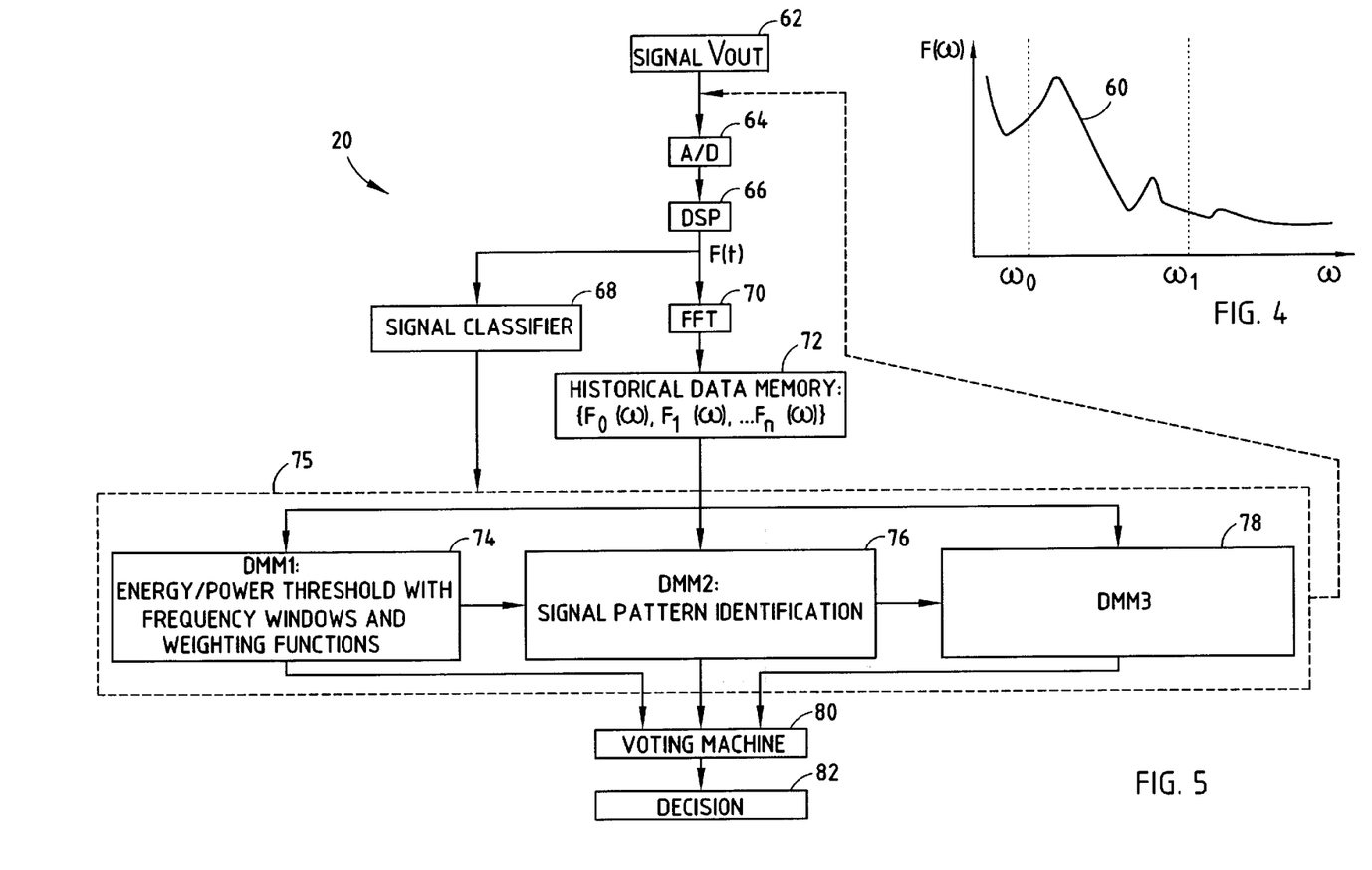
FIG. 4 is a graph illustrating an average frequency domain signal and a frequency window.
FIG. 5 is a block diagram further illustrating the radar motion sensing system.

Referring to FIG. 5, the control functions of the radar motion sensing system 20 performed by the microcontroller 20 are illustrated therein. Radar motion sensing system 20 includes an analog-to-digital (A/D) converter 64 for converting the analog output signal $V_{OUT}$ 62 to digital signals. The digitized signals are saved as data points as a set of sample data in memory. According to one example, each set of sample data may be sampled at a rate of fifty samples per second and may have a sampling length of about five seconds. The digitized signals are then processed with digital signal processing (DSP) 66 which includes band pass filtering. The band pass filtering may have cut off frequencies of 0.2 Hz and 5.0 Hz, according to one example. The band pass filtering eliminates noise, and allows for human respiration and heartbeat to remain within the frequency range defined by the cut off frequencies. A signal classifier 68 classifies the time domain signal into four types of signals referred to herein as low power/pulse type (LP/PT), high power/pulse type (HP/PT), high power/continuous type (HP/CT), and low power/continuous type (LP/CT). The four types of time domain signals are described below in further detail in connection with the radar motion sensing routine.

Radar motion sensing system 20 further performs a fast Fourier transform (FFT) 70 to convert the time domain signal to a frequency domain signal. Historic data memory 72 stores the frequency-domain signals as sets of data $\{F_{0(\omega)}, F_{1(\omega)}, \ldots F_{n(\omega)}\}$. According to one embodiment, twenty sets (n=20) of data sets may be saved in the historic data memory 72, representing a continuous record of the data signal output for the past one hundred seconds.

The radar sensing system 20 further has decision-making mechanisms 75 for processing the signal classifier output and the frequency domain data stored in the historic data memory 72. The decision-making mechanism 75 includes first, second, and third decision-making mechanisms DMM1 74, DMM2 76, and DMM3 78, respectively. The decision-making mechanism 74, 76, and 78 process the frequency domain information to determine a high, low, or intermediate C-level of confidence that an occupant is present within the vehicle. The decision-making mechanism 75 may also generate feedback signals as control logic or other parameters to tune or reconfigure the radar motion sensing system 20, such that the system 20 may be set to optimized operating conditions. Each of the decision-making mechanisms 74, 76, and 78 outputs a confidence level based signal to a voting machine 80 which processes the information and makes a decision 82 as to whether an occupant is detected within the vehicle.

Figure 6A:
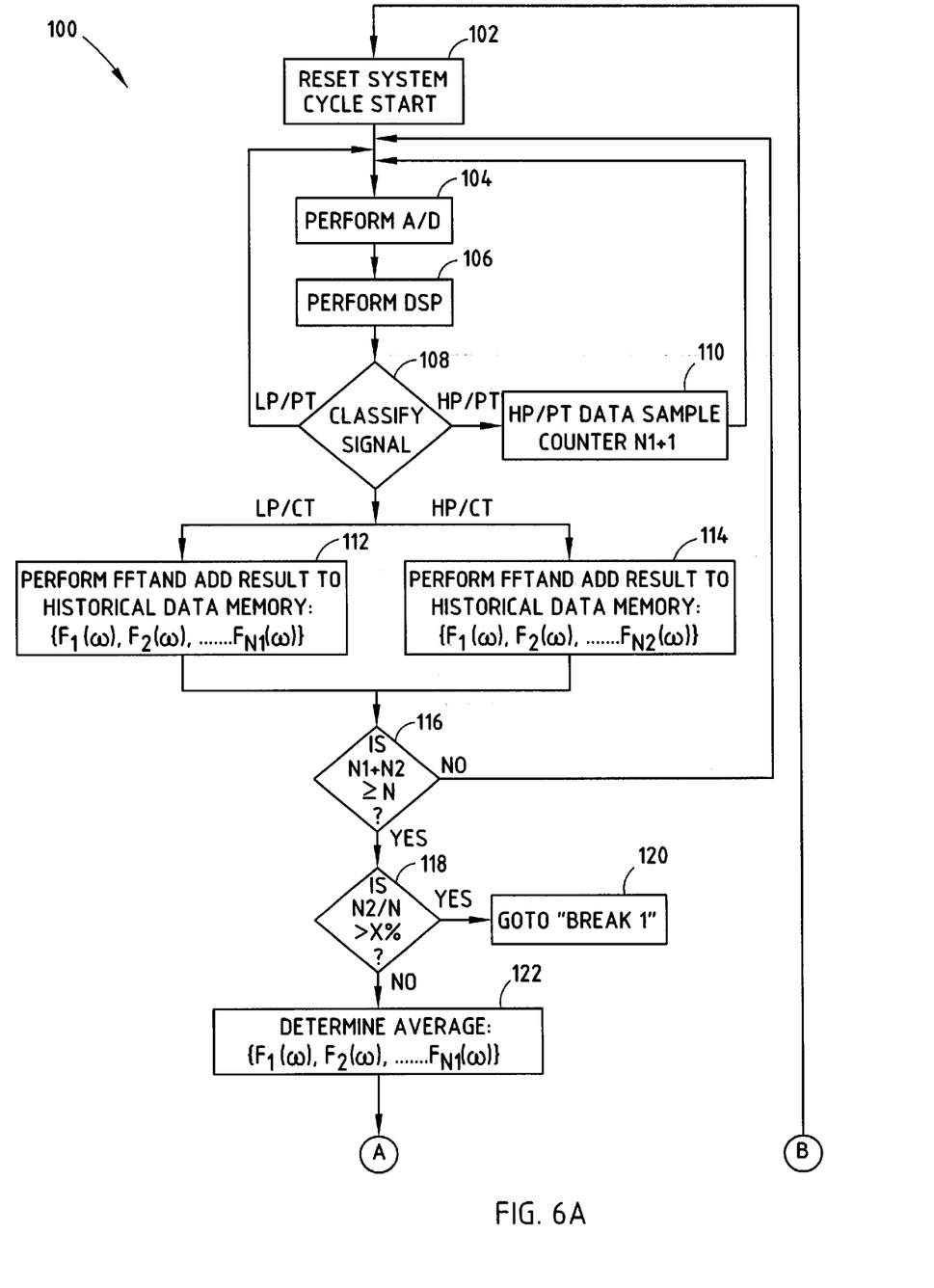
FIGS. 6A and 6B are a flow diagram illustrating a routine for detecting an occupant in a vehicle using the radar motion sensing system.
Figure 6B:
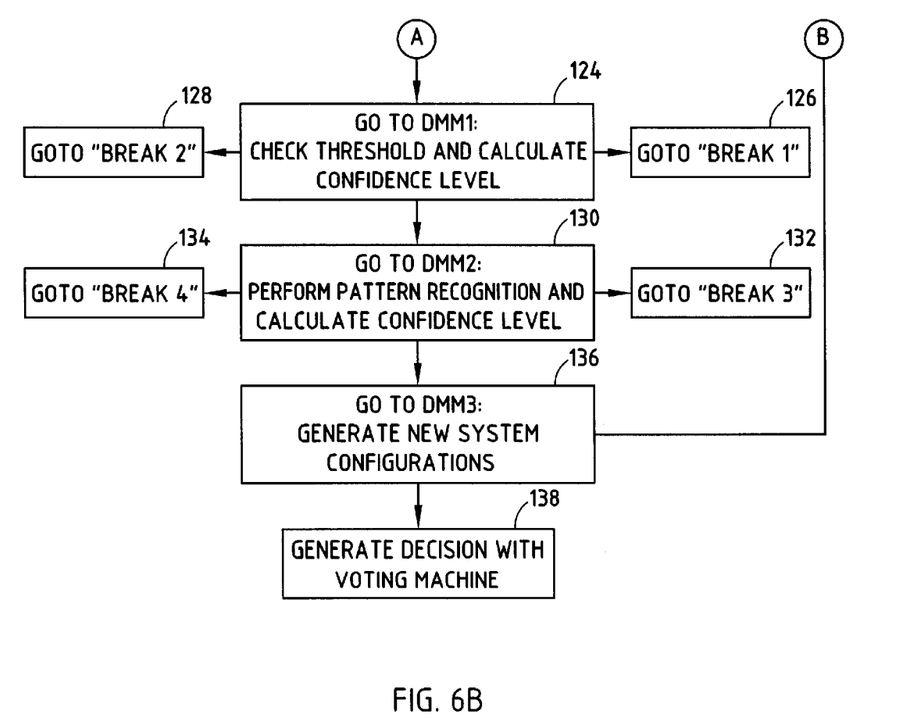

The motion sensing routine 100 for detecting the presence of an occupant in a vehicle is set forth in FIGS. 6A and 6B. Routine 100 includes step 102 of resetting the system at the beginning of each cycle. Next, routine 100 proceeds to step 104 to perform the A/D conversion, and then to step 106 to perform the digital signal processing, including the band pass filtering to remove noise and provide for the filtered time domain signal. In step 108, the motion sensing routine 100 classifies the time domain signal as one of the four time domain signals LP/PT, HP/PT, LP/CT, or HP/CT. The LP/PT signal type is a low power, pulse-type signal which typically is the result of noise (e.g., bumping the vehicle, electromagnetic interference, etc.). The signal classifier ignores the LP/PT type signal by returning back to step 104. The HP/PT type signal is a high power, pulse-type signal that typically results from a heavy bump on the roof or side doors of the vehicle, or someone getting in and out of the vehicle quickly, or may possibly be a trapped occupant moving quickly inside the vehicle and then quickly becoming substantially motionless. The HP/PT type signal is recorded by counting up (N1+1) on the HP/PT data sample counter in step 110, before returning to step 104. The data sample counter provides a value which may help the voting machine make a decision by affecting the confidence level.

If the signal is classified as either an LP/CT or HP/CT type signal, routine 100 proceeds to steps 112 or 114 to perform the FFT. The HP/CT signal is a high power, continuous type signal which is typically associated with an occupant body movement inside of the vehicle. The LP/CT signal is a low power, continuous type signal which typically occurs when there is no large occupant body movement inside the vehicle. It is generally desired that the LP/CT signal level is only associated with the occupant chest movement due to breathing or heartbeat. However, the LP/CT type signal could be due to noise. There are a number of events when such noise may appear in the LP/CT signal: (1) special conditions (e.g., heavy wind, hail, something bumping the vehicle continuously); (2) severe RF interference; and (3) the system configuration is not overloaded (e.g., too much gain or range gate). In another word, the LP/CT type signal generally is the type of signal depicting the respiration and heartbeat pattern for a sleeping occupant within the vehicle. However, the LP/CT type signal may be subjected to noise.

Parameters N1 and N2 indicate the number of samples in the LP/CT data set and HP/CT data set, respectively. N=N1+N2, defines the total number of samples collected during each detecting duty cycle. If an HP/CT type signal is detected frequently $$\left(\frac{N2}{N} \text{ is high}\right),$$

the voting machine will conclude that an occupant is detected in the vehicle at a high confidence level. Otherwise, this percentage rate will be used to adjust the overall confidence level of the decision output from the voting machine.

In step 112, the FFT transforms the LP/CT type time domain signals to the frequency domain and adds the data sets to the historic data memory to provide N1 data sets ($F_{1(\omega)}, F_{2(\omega)}, \ldots F_{N1(\omega)}$). Similarly, step 114 performs a FFT to transform the HP/CT type time domain signals to the frequency domain and adds the data sets to the historical data memory to provide N2 samples of data sets ($F_{1(\omega)}, F_{2(\omega)}, \ldots F_{N2(\omega)}$). Following steps 112 and 114, motion sensing routine 100 proceeds to step 116 to determine if the sum of samples N1 and N2 is greater than or equal to N and, if not, returns to step 104. Otherwise, motion sensing routine 100 proceeds to step 118 to check if $$\frac{N2}{N}$$

is greater than X percent, where X is a predetermined percentage (e.g., seventy percent). If $$\frac{N2}{N}$$

is greater than X percent, routine 100 proceeds to step 120 to input break 1 of the voting machine.

If $$\frac{N2}{N}$$

is not greater than X percent, motion sensing routine 100 proceeds to step 122 to determine an average signal from the N1 set of LP/CT type data samples. An example of an average signal is shown in FIG. 4, which was discussed above. Following the averaging step 122, routine 100 proceeds to step 124 to perform the operations of DMM1 which includes checking the threshold and calculating the confidence level. DMM1 may go to input break 1 of the voting machine in step 126, or go to input break 2 of the voting machine in step 128, or may proceed to perform the operations of DMM2 in step 130. In step 130, DMM2 generally performs pattern recognition and calculates a confidence level. From step 130, routine 100 may go to input break 3 of the voting machine in step 132, go to input break 4 of the voting machine in step 134, or may proceed to perform the operations of DMM3 in step 136. In step 136, DMM3 generates new system configurations and returns to step 104 or may proceed to step 138 to generate a decision with the voting machine.

Figure 7:
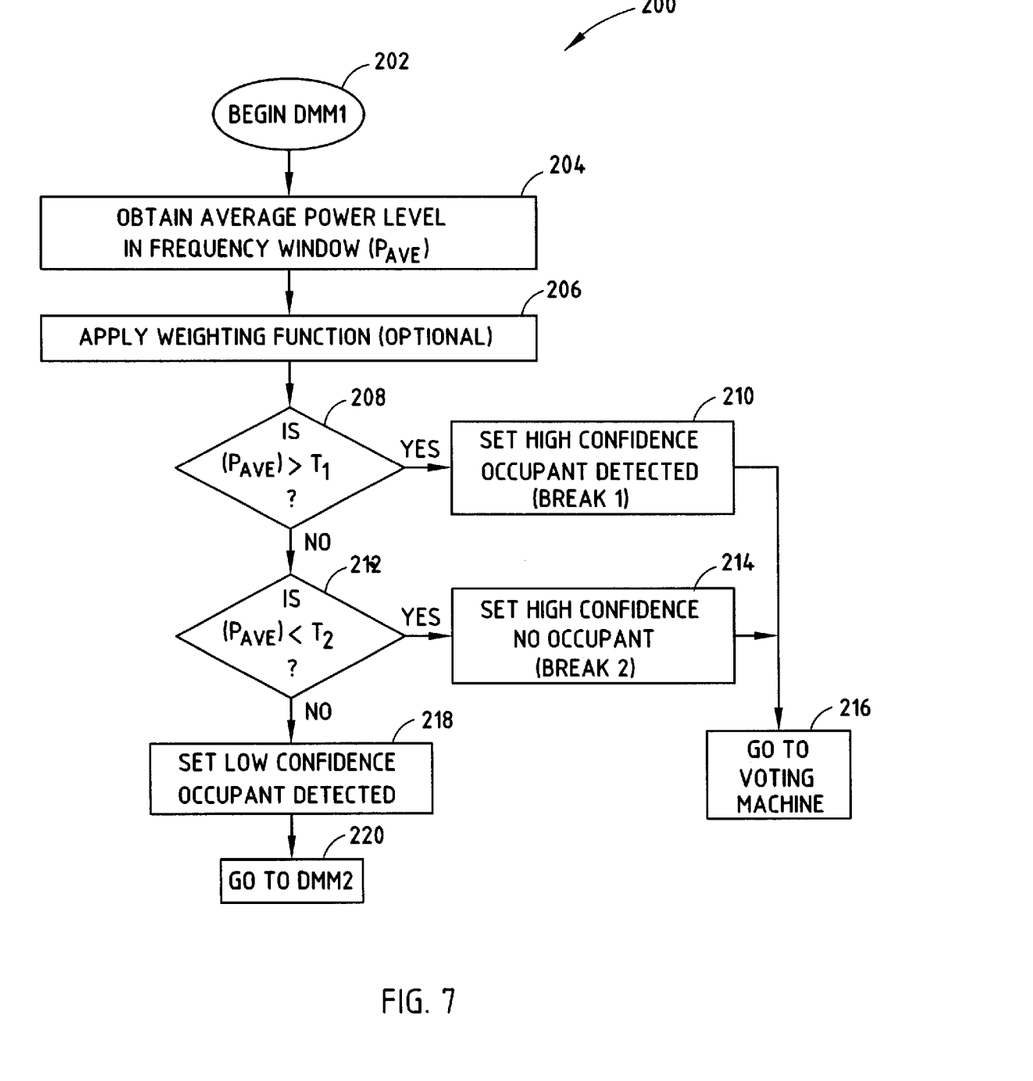
FIG. 7 is a flow diagram illustrating a routine performed by the first decision making mechanism (DMM1)

The routine 200 for performing the operations of DMM1 is further shown in FIG. 7 beginning at step 202. The DMM1 routine 200 obtains an average power level ($P_{AVE}$) in the frequency window ($\omega_0-\omega_1$). The average power level is computed as an average value of the average signal obtained from within the frequency window ($\omega_0-\omega_1$). An optional step 206 applies a weighting function to add weight (e.g., multiplication factor) to a specific frequency, if desired. Proceeding to step 208, DMM1 routine 200 checks for whether the average power $P_{AVE}$ is greater than an upper threshold $T_1$ and, if not, proceeds to step 212 to see if the average power $P_{AVE}$ is less than a lower threshold $T_2$. If the average power $P_{AVE}$ is greater than upper threshold $T_1$, DMM1 routine 200 sets an output to high confidence occupant detected as input break 1 of the voting machine, in step 210. If the average power $P_{AVE}$ is less than the lower threshold $T_2$, DMM1 routine 200 sets an output to high confidence of no occupant detected as input break 2 of the voting machine, in step 214. Once a high confidence level is set in steps 210 or 214, DMM1 routine 200 goes to the voting machine in step 216 to make a final decision.

If neither the average power $P_{AVE}$ is greater than the upper threshold $T_1$ nor lower than the lower threshold $T_2$, DMM1 routine 200 sets a low confidence occupant detected level in step 218, and thereafter proceeds to a routine to perform the operations of DMM2 in step 220.

Figure 8:
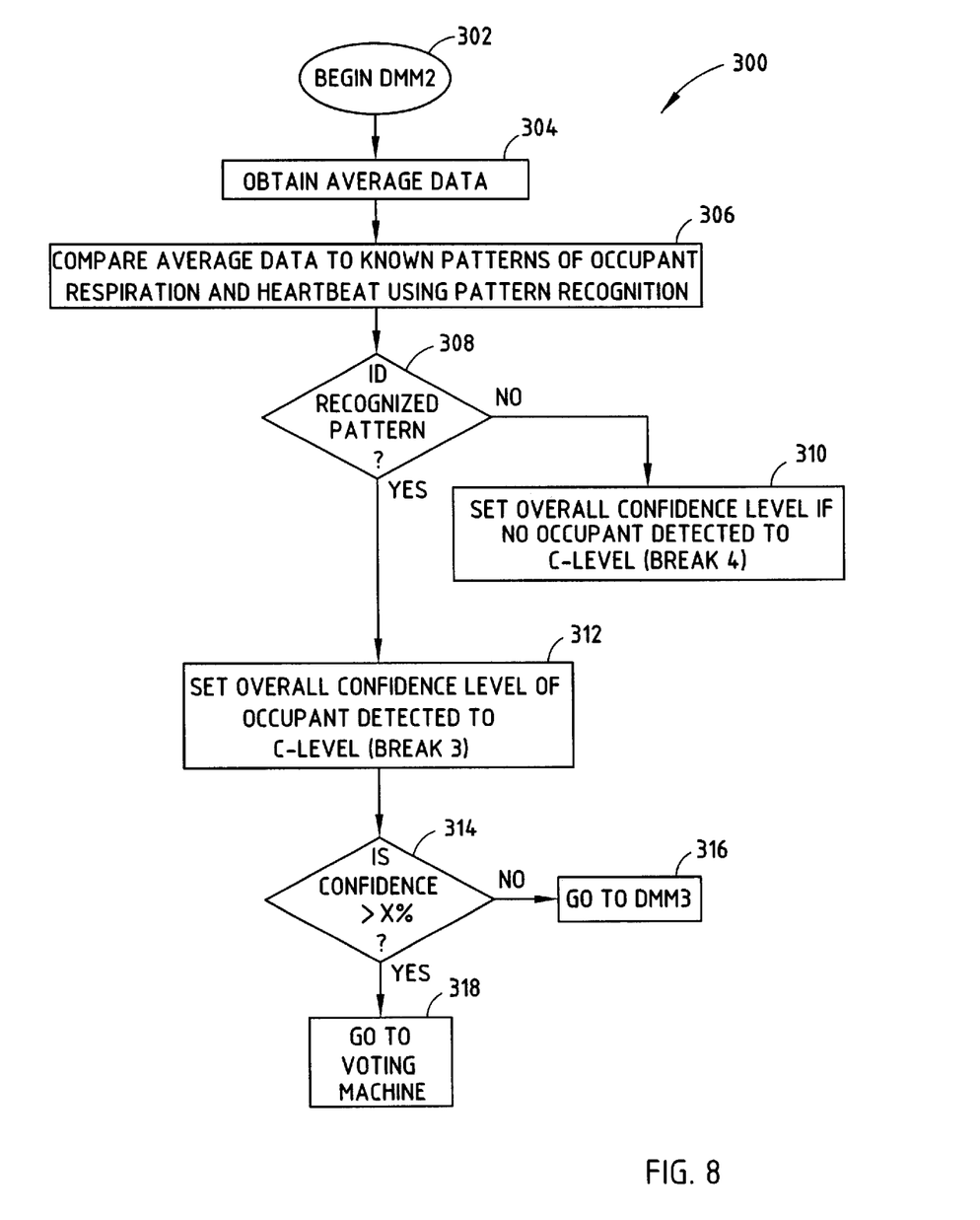
FIG. 8 is a routine performed by the second decision making mechanism (DMM2)

Referring to FIG. 8, the DMM2 routine 300 is shown beginning at step 302. DMM2 routine 300 obtains the average data curve as shown in FIG. 4, within a selected frequency window of 0–10 Hz, for example, in step 304 and compares the average data curve to known frequency patterns of occupant respiration and heartbeat caused movements using pattern recognition in step 306. By knowing an expected frequency domain pattern for the occupant body movement resulting from heartbeat and respiration of the occupant within the vehicle, a comparison to the averaged frequency domain data allows for detection of movement due to heartbeat or respiration at the expected frequency levels. In decision step 308, DMM2 routine 300 determines if a recognized pattern has been identified. If no recognized pattern has been identified, DMM2 routine 300 proceeds to step 310 to set the overall confidence level of no occupant detected to a C-level confidence level which is provided as input break 4 of the voting machine. Otherwise, if a pattern has been recognized, DMM2 routine 300 proceeds to step 312 to set the overall confidence level of occupant detected to a C-level confidence level which is provided as input break 3 of the voting machine. In decision step 314, DMM2 routine 300 decides if the confidence level is greater than X percent and, if so, proceeds to the voting machine 318 in step 318 to make a decision. If the confidence level is not greater than X percent, DMM2 routine 300 proceeds to perform the operations of DMM3 in step 316.

Figure 9:
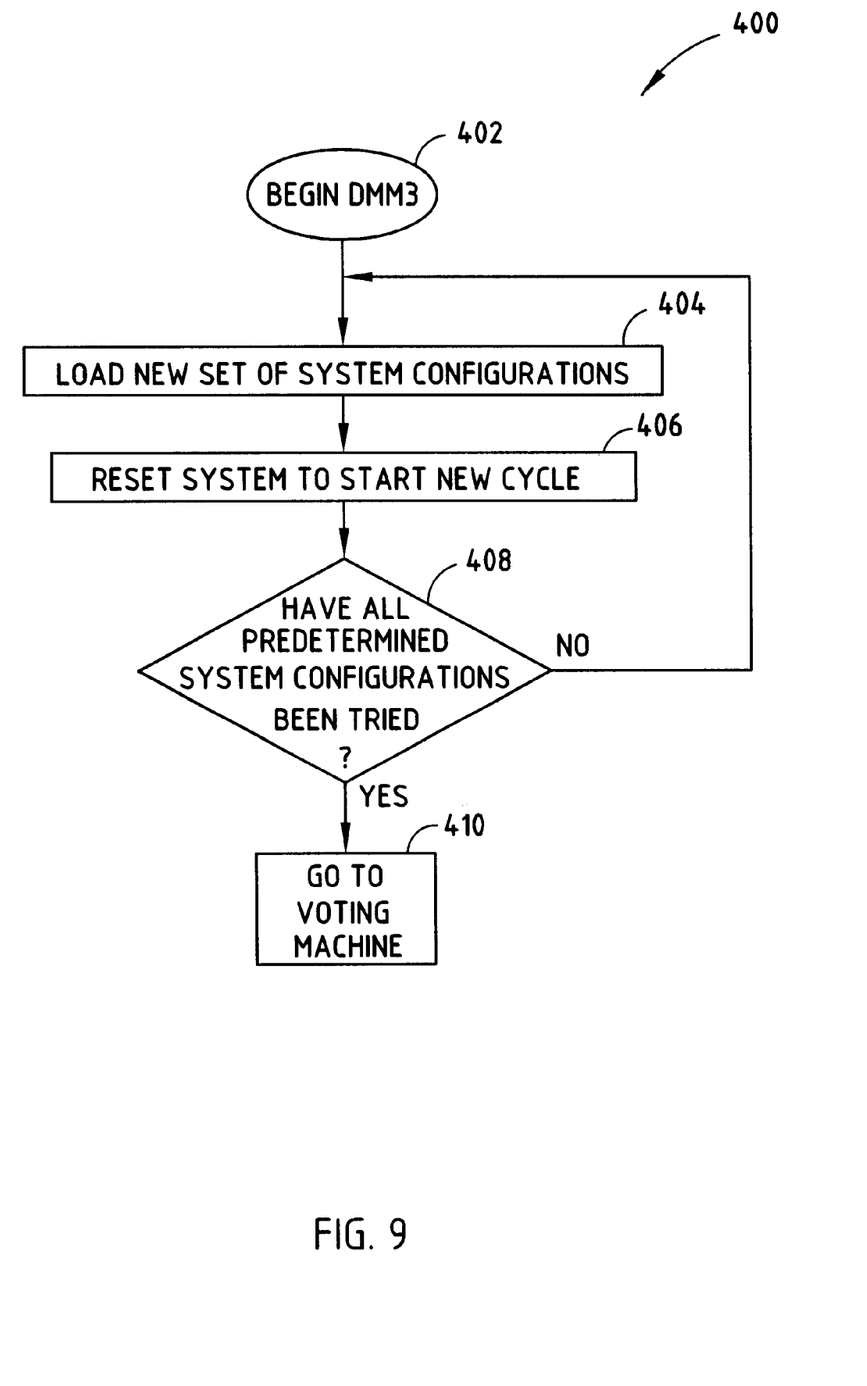
FIG. 9 is a routine performed by the third decision making mechanism (DMM3).

Referring to FIG. 9, DMM3 routine 400 is shown beginning at step 402. In step 404, DMM3 routine 400 loads a new set of system configurations, and resets the system to start a new cycle in step 406. In effect, DMM3 routine 400 is used in the event that neither DMM1 nor DMM2 make a high confidence level decision. Thus, it is assumed that the current system configurations may not be appropriate to create efficient sample data to enable the DMM1 or DMM2 to make a final decision. Thus, DMM3 routine 400 loads a new set of system configurations and resets the whole system to start a new detecting cycle. System configurations could include any of the following: range gate of radar, gain, hardware filter cut out frequency, analog-to-digital sampling length and rate, DSP configuration, total number of samples, and algorithm setup thresholds (frequency of interest window, weighting function, thresholds T1 and T2, etc.). If all the predetermined system configurations have been tried, DMM3 routine 400 will go to the voting machine in step 410 to activate the default action specifically designed to handle the uncertain decision output from the system.

It should be appreciated that the voting machine receives any of inputs break 1, break 2, break 3, break 4, and break 5 which provide a level of confidence for an occupant detected or no occupant detected. The confidence level may include high confidence of occupant detected, high confidence of no occupant detected, or C-level confidence which may vary. The voting machine generates an output message based on a high, low, or C-level of confidence. If the voting machine receives a high confidence level of occupant detected, the output becomes occupant detected. If a high confidence of no occupant is detected, the output becomes no occupant detected. If a C-level of occupant detected or no occupant detected is received, the voting machine processes the C-level to see if the C-level value is greater than a predefined value to make a decision of whether an occupant is detected within the vehicle or not. If needed, the voting machine will include this C-level value in the message output through driver 56 (could be a vehicle network such as CAN bus) to other module(s) of the vehicle. This value may help the other module(s) to take adequate actions based on the difference in the confidence level.

The voting machine may be configured to process the high, low, and C-level confidence levels according to various algorithms. The decisions may vary depending on system configurations as should be evident to those skilled in the art. When an occupant is detected trapped within the vehicle, the voting machine generates an output signal indicative of a high confidence decision, a low confidence decision, or an intermediate C-level confidence decision. The decision may be used to provide an indication or warning to the driver of the vehicle, according to one embodiment. Further, it should be appreciated that the voting machine may provide an output signal external to the vehicle to initiate other action, such as calling emergency personnel. The message could be communicated through an existing in-vehicle communication bus such as CAN, GMLAN, etc. According to one example, if an occupant is detected trapped within the vehicle and the temperature sensors indicate an extreme interior temperature within the vehicle, emergency personnel may be notified of this condition such that they may provide assistance to the occupant trapped within the vehicle. These and other applications may be achieved by using the occupant detection system and method of the present invention.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. A motion detection system for detecting the presence of an occupant in a vehicle, said detection system comprising:
   a radar motion sensor located in a compartment of a vehicle, said radar sensor transmitting and receiving radar signals within the compartment and generating sensed signals; and
   a controller converting the sensed signals to a frequency domain, said controller further processing the frequency domain of sensed signals within a frequency range and determining the presence of movement of an occupant due to one of heartbeat and breathing, wherein said controller compares the frequency domain of sensed signals within the frequency range to a predetermined frequency characteristic, and further identifies a frequency of the sensed signals indicative of movement of an occupant due to one of heartbeat and breathing.

2. The detection system as defined in claim 1, wherein the controller determines an average value of the sensed signals within the frequency range, said controller further comparing the average value to a threshold value to determine the presence of movement of an occupant due to one of heartbeat and breathing.

3. The detection system as defined in claim 2, wherein the average signal is computed based on a plurality of sensed sets of radar signals.

4. The detection system as defined in claim 1, wherein the frequency domain of sensed signals comprises an average signal waveform computed from a plurality of sets of sensed signals.

5. The detection system as defined in claim 1, wherein said radar motion sensor comprises a Differential Pulse Doppler radar motion sensor.

6. The detection system as defined in claim 1, further comprising a signal classifier for classifying the sensed signals into pulse type signals and continuous type signals, wherein the continuous type signals are processed by the controller to determine the presence of movement of an occupant due to one of heartbeat and breathing.

7. The detection system as defined in claim 6, wherein the pulse type signals are ignored by the controller in determining the presence of movement of an occupant due to one of heartbeat and breathing.

8. The detection system as defined in claim 6, wherein the continuous type signals are further classified into low power signals and high power signals, wherein the low power signals are processed to determine the presence of movement of an occupant due to one of heartbeat and breathing.

9. The detection system as defined in claim 1, wherein the controller generates one of an output signal of a high confidence level and a low confidence level.

10. The detection system as defined in claim 9, wherein the controller generates one of a high confidence level, a low confidence level, and an intermediate confidence level.

11. A method of detecting the presence of an occupant in a vehicle, said method comprising the steps of:
 transmitting radar signals within a compartment in a vehicle;
 receiving the transmit radar signals;
 generating radar sensor output signals;
 transforming the radar sensor output signals to a frequency domain;
 processing the frequency domain of radar sensor output signals within a frequency range, said processing comprising comparing the frequency domain of radar sensor output signals within the frequency range to a predetermined frequency characteristic indicative of movement due to one of heartbeat and breathing of an occupant; and
 determining movement due to one of breathing and heartbeat of an occupant based on the processing.

12. The method as defined in claim 11, wherein said step of processing the frequency domain of radar sensor output signals comprises determining an average value of the radar sensor output signals within the frequency range, and comparing the average value to a threshold value, wherein the movement is determined as a function of the comparison.

13. The method as defined in claim 11, wherein said step of comparing comprises recognizing a pattern having the predetermined frequency characteristic.

14. The method as defined in claim 11, wherein said method further comprises the step of converting the radar sensor output signals from analog to digital signals.

15. The method as defined in claim 11 further comprising the step of averaging the radar sensor output signals.

16. The method as defined in claim 11 further comprising the step of comparing an amplitude of the radar sensor output signals to an upper threshold and determining movement of an occupant if the radar sensor output signal exceeds the upper threshold.

17. The method as defined in claim 11 further comprising the steps of:
 comparing the received radar sensor output signals with an upper threshold;
 determining movement of an occupant in the vehicle if the radar sensor output signals exceed the upper threshold;
 comparing the radar sensor output signals with a lower threshold less than the upper threshold;
 determining the presence of no movement due to an occupant in the vehicle when the received radar sensor output signals are less than the lower threshold; and
 comparing the frequency response of the radar sensor output signals to a predetermined frequency of movement due to one of heartbeat and breathing of an occupant when the radar sensor output signals are between the upper and lower thresholds.

18. The method as defined in claim 11 further comprising the step of classifying the radar sensor output signals into pulse type signals and continuous type signals, wherein the continuous type signals are processed to determine movement due to one of breathing and heartbeat of an occupant.

19. The method as defined in claim 18 further comprising the step of ignoring the pulse type signals during the processing step.

20. The method as defined in claim 18 further comprising the step of classifying the continuous type signals into low power signals and high power signals, wherein the low power signals are processed to determine the movement due to one of breathing and heartbeat of an occupant.

21. The method as defined in claim 11 further comprising the step of generating one of an output signal of a high confidence level and a low confidence level.

22. The method as defined in claim 11 further comprising the step of generating one of an output signal of a high confidence level, a low confidence level, and an intermediate level.

23. A motion detection system for detecting the presence of a living being, said detection system comprising:
 a radar motion sensor transmitting and receiving radar signals within a coverage zone and generating sensed signals; and
 a controller converting the sensed signals to a frequency domain, said controller further processing the frequency domain of sensed signals within a frequency range and determining the presence of movement of a living being due to one of heartbeat and breathing, wherein said controller compares the frequency domain of sensed signals within the frequency range to a predetermined frequency characteristic, and further identifies a frequency of the sensed signals indicative of movement of a living being due to one of heartbeat and breathing.

24. The detection system as defined in claim 23, wherein the frequency domain of sensed signals comprises an average signal waveform computed from a plurality of sets of sensed signals.

25. The detection system as defined in claim 23, wherein the living being comprises a human being.

26. A method of detecting the presence of a living being, said method comprising the steps of:

transmitting radar signals within a coverage zone;

receiving the transmit radar signals;

generating radar sensor output signals;

transforming the radar sensor output signals to a frequency domain;

processing the frequency domain of radar sensor output signals within a frequency range, said processing comprising comparing the frequency domain of radar sensor output signals within the frequency range to a predetermined frequency characteristic indicative of movement due to one of heartbeat and breathing of a living being; and determining movement due to one of breathing and heartbeat of a living being based on the processing.

27. The method as defined in claim 26, wherein said step of comparing comprises recognizing a pattern having the predetermined frequency characteristic.

28. The method as defined in claim 26, wherein the living being comprises a human being.

* * * * *